(12) United States Patent
Purushothaman et al.

(10) Patent No.: US 11,645,401 B2
(45) Date of Patent: *May 9, 2023

(54) SYSTEM AND METHOD FOR MANAGING BUILT-IN SECURITY FOR CONTENT DISTRIBUTION

(71) Applicant: Bank of America Corporation, Charlotte, NC (US)

(72) Inventors: Sasidhar Purushothaman, Hyderabad (IN); Satish Kumar Kommineni, Hyderabad (IN); Ramesh Lakshmi Narayanan, Chennai (IN); Venkata Apparao Alla, Hyderabad (IN); Puram Madhuri Rao, Hyderabad (IN); Kyriacos Iacovou, Bayside, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/654,711

(22) Filed: Mar. 14, 2022

(65) Prior Publication Data
US 2022/0198033 A1  Jun. 23, 2022

Related U.S. Application Data

(63) Continuation of application No. 16/885,390, filed on May 28, 2020, now Pat. No. 11,314,876.

(51) Int. Cl.
*G06F 7/04* (2006.01)
*G06F 21/60* (2013.01)
(Continued)

(52) U.S. Cl.
CPC ............ *G06F 21/606* (2013.01); *G06F 21/64* (2013.01); *H04L 63/0815* (2013.01); *H04L 63/0876* (2013.01); *H04L 69/04* (2013.01)

(58) Field of Classification Search
CPC .... G06F 21/31; G06F 21/565; G06F 21/6218; G06F 21/645; G06F 21/606; G06F 21/64;
(Continued)

(56) References Cited

U.S. PATENT DOCUMENTS 5,060,263 A  10/1991  Bosen et al.
5,319,710 A   6/1994  Atalla et al.
(Continued)

FOREIGN PATENT DOCUMENTS

AU  2007237159 B2  12/2007
CA     2754268 C    9/2010
(Continued)

OTHER PUBLICATIONS

Tolani et al, XGRIND: A Query-Friendly XML Compressor, Mar. 1, 2002, IEEE, pp. 1-10. (Year: 2002).*
(Continued)

*Primary Examiner* — Luu T Pham
*Assistant Examiner* — Jenise E Jackson

(57) ABSTRACT

A system is configured for managing a plurality of files containing sensitive information associated with an organization to be sent to a particular receiver. The system is further configured to determine whether the particular receiver is an internal receiver or an external receiver with respect to the organization. If the particular receiver is an external receiver, a CRC code generated from the personal information and location coordinates of an external server where the plurality of files will be accessed is added to the plurality of files. A security code is also added to the plurality of files to facilitate that they are secured from being exposed and disposed at a retention time set by the organization. The system generates a custom compressed file from
(Continued)

the plurality of files, configures it to be decompressed by the personal information of the external receiver, and sends it to the external receiver.

20 Claims, 4 Drawing Sheets

(51) Int. Cl.
*G06F 21/64* (2013.01)
*H04L 9/40* (2022.01)
*H04L 69/04* (2022.01)

(58) Field of Classification Search
CPC .. H04L 63/0815; H04L 63/0876; H04L 69/04
See application file for complete search history.

(56) References Cited

U.S. PATENT DOCUMENTS

| | | | |
|---|---|---|---|
| 6,529,894 | B1 | 3/2003 | Haeri et al. |
| 7,167,565 | B2 | 1/2007 | Rajasekaran |
| 7,257,844 | B2 | 8/2007 | Woodward |
| 7,391,865 | B2 | 6/2008 | Orsini et al. |
| 7,690,026 | B2 | 3/2010 | Zhu et al. |
| 7,921,292 | B1 | 4/2011 | Pauker et al. |
| 8,028,040 | B1* | 9/2011 | Hobbs ................. G06F 9/45558 710/63 |
| 8,726,010 | B2 | 5/2014 | Mathur et al. |
| 8,869,290 | B2 | 10/2014 | Chen et al. |
| 9,590,961 | B2 | 3/2017 | Sundaram et al. |
| 9,853,977 | B1 | 12/2017 | Laucius et al. |
| 10,547,444 | B2 | 1/2020 | Harris et al. |
| 2003/0032409 | A1 | 2/2003 | Hutcheson et al. |
| 2004/0098609 | A1 | 5/2004 | Bracewell et al. |
| 2006/0064605 | A1 | 3/2006 | Giobbi |
| 2007/0033419 | A1 | 2/2007 | Kocher et al. |
| 2009/0168741 | A1* | 7/2009 | Masuda ................. H04L 67/52 370/343 |
| 2010/0071030 | A1 | 3/2010 | Rosenan et al. |
| 2010/0115253 | A1 | 5/2010 | Lipsky et al. |
| 2010/0205677 | A1 | 8/2010 | Kawamoto et al. |
| 2011/0066730 | A1 | 3/2011 | Julia et al. |
| 2011/0110516 | A1 | 5/2011 | Satoh |
| 2012/0039534 | A1* | 2/2012 | Malik ................. H03M 7/3064 382/173 |
| 2013/0024434 | A1* | 1/2013 | Dykeman ............. G06F 16/217 707/693 |
| 2013/0073816 | A1* | 3/2013 | Seo ..................... G06F 12/0246 711/E12.001 |
| 2019/0342569 | A1* | 11/2019 | Kim ................. H04N 21/43615 |
| 2021/0374260 | A1 | 12/2021 | Purushothaman et al. |

FOREIGN PATENT DOCUMENTS

| | | |
|---|---|---|
| CA | 2767368 C | 2/2011 |
| CN | 102196436 B | 9/2011 |
| EP | 2334008 A1 | 6/2011 |
| KR | 20080035875 A | 4/2008 |
| KR | 101620246 B1 | 5/2016 |
| WO | 2007052491 A1 | 5/2007 |
| WO | 2013041394 A1 | 3/2013 |
| WO | 2016061411 A1 | 4/2016 |

OTHER PUBLICATIONS

Quiang et al, GQComp: A Query-Supported Compression Technique for GML, Oct. 14, 2009, IEEE, pp. 311-317. (Year: 2009).*
Tolani, P.M. et al., "XGrind: a query-friendly XML compressor," Proceedings 18th International Conference on Data Engineering, Feb. 26-Mar. 1, 2002, pp. 1-10.
Dai, Q. et al., "GQComp: A Query-Supported Compression Technique for GML," 2009 Ninth IEEE International Conference on Computer and Information Technology, Oct. 11-14, 2009, pp. 311-317.

* cited by examiner

SYSTEM AND METHOD FOR MANAGING BUILT-IN SECURITY FOR CONTENT DISTRIBUTION

CROSS-REFERENCE TO RELATED APPLICATIONS

This application is a continuation of U.S. patent application Ser. No. 16/885,390 filed May 28, 2020, by Sasidhar Purushothaman et al., and entitled "SYSTEM AND METHOD FOR MANAGING BUILT-IN SECURITY FOR CONTENT DISTRIBUTION," which is incorporated herein by reference.

TECHNICAL FIELD

The present disclosure relates generally to content distribution systems, and more specifically to a system and a method for managing built-in security for content distribution.

BACKGROUND

Large corporations, universities, government agencies, and the like, often have content distribution systems that permit a plurality of users to distribute content to one or more destinations, such as a plurality of servers, folders within a file structure, and the like. A user from the mentioned organizations may wish to send a plurality of files that contain sensitive information to a particular receiver. Typically, the user compresses the files containing sensitive information with a password and sends the compressed file to the particular receiver and shares the password with the particular receiver to decompress the files. The particular receiver may then access the files using the password. Once the particular receiver has accessed the confidential information, there is no mechanism of facilitating that the confidential information is secured from being exposed to the public. Usually, the confidential information remains exposed permanently in a computing device of the particular receiver unless it is manually removed at the discretion of the particular receiver. This approach of sharing confidential information poses a risk of exposure and breach of confidential information for an unforeseeable time. Current content distribution technologies do not secure the sensitive information from being exposed.

SUMMARY

In one embodiment, a system for managing a plurality of files associated with an organization includes a processor configured to determine whether the particular receiver is an internal receiver or an external receiver with respect to the organization based on credential information of the internal receiver and personal information of the external receiver. The plurality of files contains sensitive information that a particular receiver is authorized to access. If the particular receiver is an internal receiver, the processor identifies the internal receiver based on a person's credential information and adds the person's credential information to the plurality of the files. The processor then generates a first custom compressed file from the plurality of files, wherein the first custom compressed file is configured to be decompressed by the internal receiver using the person's credential information. The processor then sends the first custom compressed file to an archival storage that is accessible to internal and external receivers. The internal receiver may decompress the first custom compressed file at an internal receiver using the person's credential information.

If the particular receiver is an external receiver, the processor identifies the external receiver based on the person's personal information. The processor then adds a cyclic redundancy check (CRC) code to the plurality of files, wherein the CRC code comprises the personal information of the external receiver and location coordinates of an external server at which the external receiver will access the plurality of files. The processor then adds a security code to the plurality of files, wherein the security code comprises a feedback mechanism, an archival compliance mechanism, and a self-destruction mechanism with a retention time. The processor then generates a second custom compressed file from the plurality of files, wherein the second custom compressed file is configured to be decompressed by the external receiver using the person's personal information. The processor then sends the second custom compressed file to the archival storage.

When the external receiver decompresses the second custom compressed file at the external server, the security code is executed. The feedback mechanism of the security code identifies other files associated with the decompressed files in the external server. The feedback mechanism of the security code also tracks locations of the decompressed files and other files associated with the decompressed files by searching directories of the external server. The archival compliance mechanism of the security code monitors the decompressed files and other files associated with the decompressed files to detect any unauthorized actions performed on the decompressed files and other files associated with the decompressed files. Then, the feedback mechanism of the security code sends feedback reports of actions performed on the decompressed files and other files associated with the decompressed files, e.g., to a sender of the second custom compressed files. The self-destruction mechanism of the security code deletes the decompressed files and the other files associated with the decompressed files at the retention time. The retention time of the self-destruction is configurable and set by the sender.

As discussed above in the background section, the existing content distribution technologies do not secure the sensitive information from being exposed to the public once the user sends the password-protected file containing sensitive information to a receiver and shares the password to access the sensitive information with the receiver. Certain embodiments of this disclosure provide unique solutions to technical problems of the existing content distribution technologies for securing sensitive information from exposure by providing a security code customized based on the recipient of the sensitive information. For example, the disclosed system provides several technical advantages which include 1) determining that the sensitive information is received and accessed by the particular receiver, regardless of whether the particular receiver is the internal receiver or external receiver with respect to the organization; 2) in a case where the particular receiver is the external receiver, determining that the sensitive information is accessed at the location coordinates of the external server; 3) in a case where the particular receiver is the external receiver, facilitating the disposal of sensitive information after the retention time. One skilled in the art would appreciate that the disclosed system, in a case where the particular receiver is the internal receiver, would be able to use location coordinates of the internal server to facilitate that the sensitive information is accessed at the location coordinates of the internal server and to dispose of the sensitive information after the retention time. In an event that sensitive information is not disposed of by the retention time (e.g., due to an error), the system receives a feedback report indicating that sensitive information is not disposed of by the retention time and initiates the destruction of the confidential information as a redundancy measure. As such, this disclosure may improve the function of the existing content distribution technologies.

Accordingly, the system described herein provides a practical application of managing the distribution and retention of content communicated to internal and/or external servers. This, in turn, provides the additional practical application of improving the security of the content being distributed. The described system also improves the operation of the underlying computer and memory components. In particular, by initiating the destruction of certain sensitive information, the memory of various servers may be cleared out, thereby preserving memory space for other data. Moreover, by initiating the destruction of certain sensitive information that may pose a security vulnerability, the operation of the processors of the those servers may be improved.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
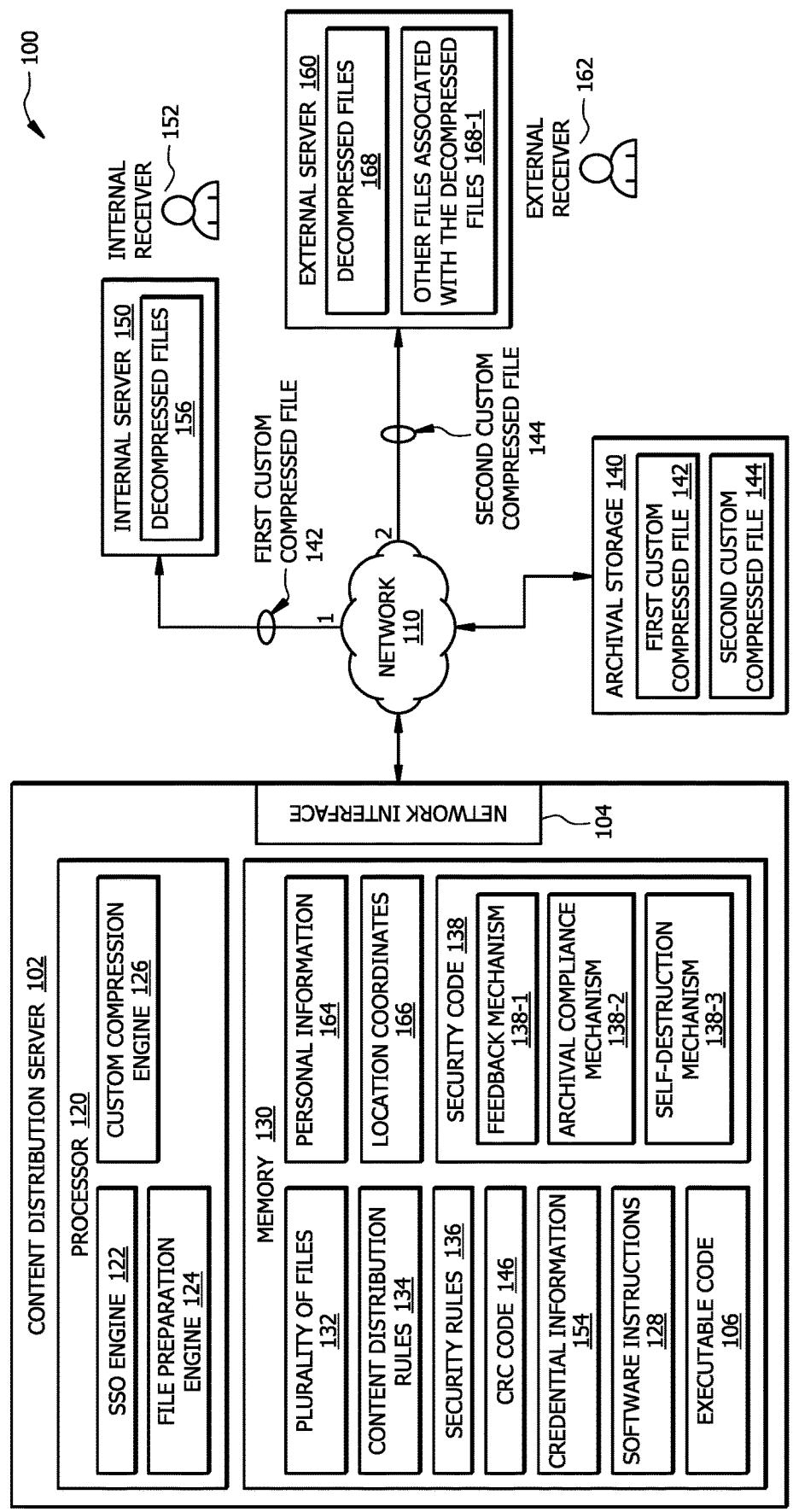
FIG. 1 illustrates one embodiment of a system configured to manage content distribution.

FIG. 1 illustrates one embodiment of a system 100 configured to manage content distribution associated with an organization. In one embodiment, the system 100 comprises a content distribution server 102 in signal communication with an archival storage 140, one or more internal receivers 150 associated with a corresponding internal receiver 152, and one or more external receivers 160 associated with a corresponding external receiver 162, through a network interface 104 via a network 110. In one embodiment, the content distribution server 102 may include a processor 120 in signal communication with a memory 130 that includes one or more program modules having instructions that when executed by the processor 120 cause the content distribution server 102 to perform one or more functions described herein and/or one or more databases that may store and/or otherwise maintain information which may be used by such program modules and/or processor 120. In some embodiments, processor 120 includes a single-sign-in (SSO) engine 122, a file preparation engine 124, and a custom compression engine 126. In other embodiments, system 100 may not have all of the components listed and/or may have other elements instead of, or in addition to, those listed above.

In general, the system 100 facilitates an improved content distribution system, especially when sensitive information is being distributed to a particular receiver who is authorized by the organization to access the sensitive information. The system 100 facilitates that the sensitive information is secured from being exposed to people other than the particular receiver. The system 100 also facilitates disposing of the sensitive information by initiating deletion of the sensitive information at the end of a retention time set by a sender of the sensitive information. Therefore, the system 100 improves the content distribution technologies by providing data security transmission methods.

Network interface 104 is configured to enable wired and/or wireless communications (e.g., via network 110). The network interface 104 is configured to communicate data between the content distribution server 102 and other network devices, systems, or domain(s). For example, the network interface 104 may comprise a WIFI interface, a local area network (LAN) interface, a wide area network (WAN) interface, a modem, a switch, or a router. The processor 120 is configured to send and receive data using the network interface 104. The network interface 104 may be configured to use any suitable type of communication protocol as would be appreciated by one of ordinary skill in the art.

Network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Processor 120 comprises one or more processors operably coupled to the memory 130 and network interface 104. The processor 120 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 120 may be a programmable logic device, a microcontroller, a microprocessor, or any suitable combination of the preceding. The processor 120 is communicatively coupled to and in signal communication with the memory 130 and network interface 104. The one or more processors are configured to process data and may be implemented in hardware or software. For example, the processor 120 may be 8-bit, 16-bit, 32-bit, 64-bit or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement SSO engine 122, file preparation engine 124, and custom compression engine 126. In this way, processor 120 may be a special purpose computer designed to implement the functions disclosed herein. In an embodiment, the SSO engine 122, file preparation engine 124, and custom compression engine 126 are implemented using logic units, FPGAs, ASICs, DSPs, or any other suitable hardware. The SSO engine 122, file preparation engine 124, and custom compression engine 126 are configured to operate as described in FIGS. 1-3. For example, the SSO engine 122, file preparation engine 124, and custom compression engine 126 may be configured to perform the steps of method 300 as described in FIG. 3, respectively.

Memory 130 comprises one or more disks, tape drives, or solid-state drives, and may be used as an over-flow data storage device, to store programs when such programs are selected for execution, and to store instructions and data that are read during program execution. The memory 130 may be volatile or non-volatile and may comprise read-only memory (ROM), random-access memory (RAM), ternary content-addressable memory (TCAM), dynamic random-access memory (DRAM), and static random-access memory (SRAM). The memory 130 is operable to store a plurality of files 132, content distribution rules 134, security rules 136, a security code 138, a CRC code 146, credential information 154, personal information 164, location coordinates 166 and/or any other data or instructions. The content distribution rules 134, security rules 136, security code 138, and CRC code 146 may comprise any suitable set of instructions, logic, rules, or code operable to execute the SSO engine 122, file preparation engine 124, and custom compression engine 126. The plurality of files 132, content distribution rules 134, security rules 136, security code 138, CRC code 146, credential information 154, personal information 164 are described in FIGS. 1-3, in more detail.

Content Distribution Server

In one embodiment, the content distribution server 102 is generally a server, or any other computing device configured to communicate with other computing devices of system 100 through the network interface 104 via network 110. In one embodiment, the content distribution server 102 may be associated with a particular organization and may be configured to manage content distribution to one or more receivers within and/or outside of the organization.

A user operating the content distribution server 102 may wish to send a plurality of files 132 to a particular receiver. In some embodiments, the plurality of files 132 may include one or more files that contain sensitive or confidential information that the particular receiver is authorized by the organization and/or the user to access. For instance, the sensitive information may include personal information, bank account information, loan information, business strategy information, and/or the like. The content distribution server 102, for example by processor 120, is configured to determine whether the particular receiver is an internal receiver or an external receiver with respect to the organization. In some examples, the internal receiver with respect to the organization may be an employee of the organization such as internal receiver 152 who has access to internal servers 150 of the organization, where the internal servers 150 are accessible to the internal receivers 152 via a private network of the organization. The internal servers 150 may be any computing device associated with the organization operable to communicate data with other computing devices via network 110.

In contrast, the external receiver with respect to the organization is not an employee of the organization such as external receiver 162 who does not have access to internal servers 150. Thus, the external receiver 162 may receive the plurality of files 132 at an external server 162 which may be another organization's server, the personal computing device of the external receiver 162 operable to communicate data with other computing devices through network 110. In one operational embodiment, the content distribution server 102, for example by processor 120, determines that the particular receiver is an internal receiver 152 based on credential information 154 of the internal receiver 152 stored in memory 130. In an alternative operational embodiment, the content distribution server 102, for example by processor 120, determines that the particular receiver is an external receiver 162 based on personal information 164 of the external receiver 162 stored in memory 130. Two examples of sending the plurality of files 132 to the internal receiver 152 and the external receiver 162 with respect to the organization are described in detail in FIG. 2.

SSO Engine

Figure 2:
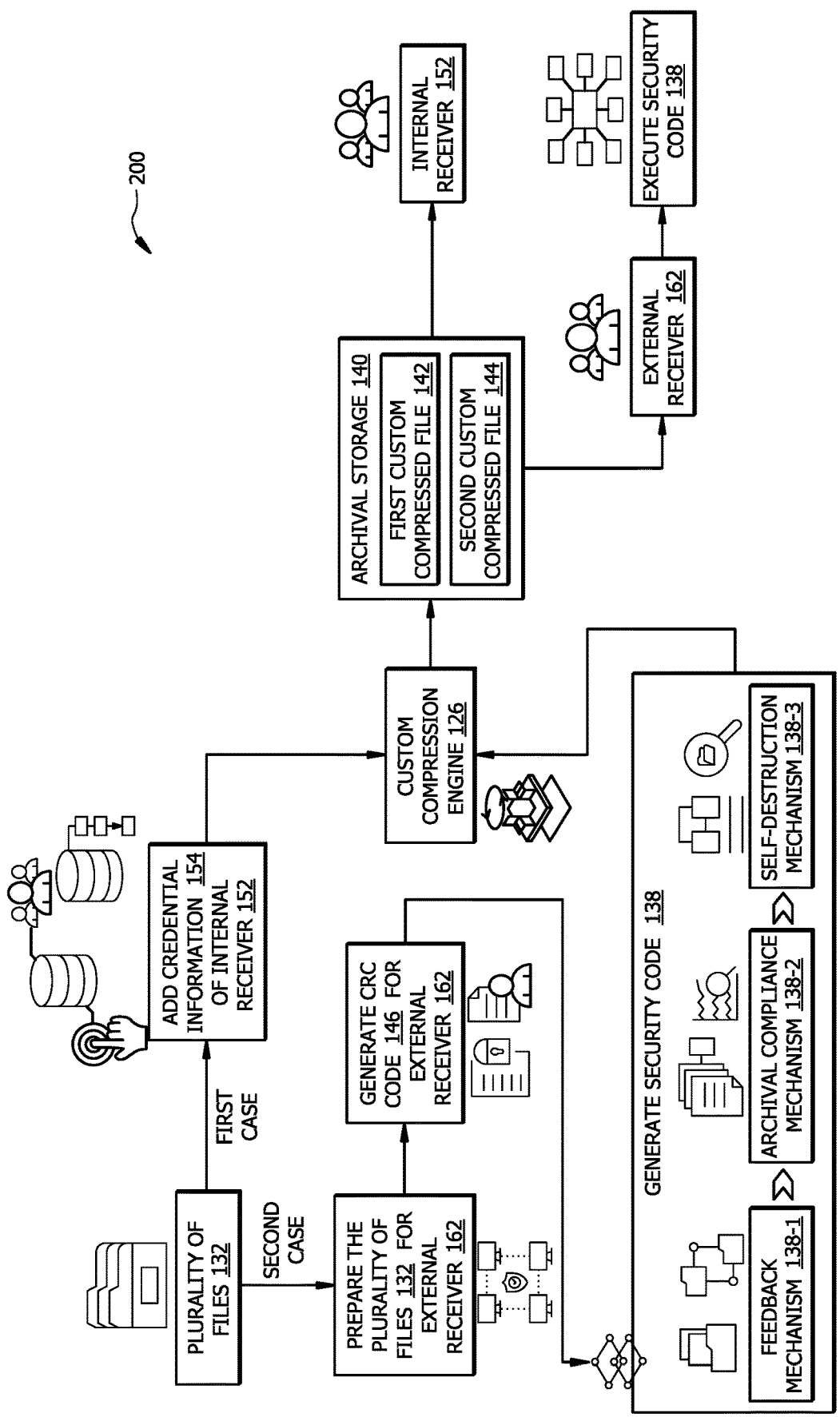
FIG. 2 illustrates one embodiment of an operational flow of the system depicted in FIG. 1.

SSO engine 122 may include or be provided with software instructions 128 executed by the processor 120 that is triggered in a case where the plurality of files 132 is being prepared to be sent to an internal receiver 152. Referring to FIG. 2, when the user selects the plurality of files 132 to be sent to the internal receiver 152, the SSO engine 122 is configured to add the credential information 154 of the internal receiver 152 to the plurality of file 132, where the credential information 154 is given to the user by the internal receiver 152 and/or is already present in the employee database of the organization in memory 130. This operation is described in greater detail below. In one embodiment, the SSO engine 122 identifies the internal receiver 152 by searching and matching credential information 154 from the employee database of the organization in memory 130. The credential information 154 may comprise login information, such as username and password, of the internal receiver 152 to log in to the internal server 150. In some cases, the plurality of files 132 may be prepared to be sent to a plurality of internal receivers (e.g., internal receiver 152) with respect to the organization. In such cases, for each of the plurality of receivers, the SSO engine 122 is configured to add the credential information 154 of each of the plurality of internal receivers 152 to the plurality of files 132. Here, each of the plurality of internal receivers 152 will be able to access the plurality of files 132 with an authentication process based on their individual credential information 154. The SSO engine 122 may also be configured to attach a list of internal receivers 152 authorized to receive the plurality of file 132. This way, each of the internal receivers 152 are informed who else is accessing the plurality of files 132. Details of operation of the SSO engine 122 are described in conjunction with the operational flow illustrated in FIG. 2.

File Preparation Engine

File preparation engine 124 may include or be provided with software instructions 128 executed by the processor 120 that is triggered in a case where the plurality of files 132 is being prepared to be sent to an external receiver 162. Referring to FIG. 2, when the user selects the plurality of files 132 to be sent to the external receiver 162, the file preparation engine 124 is configured to generate and add the CRC code 146 to the plurality of file 132 by using an automation script function described below. The file preparation engine 124 generates the CRC code 146 from personal information 164 of the external receiver 162 and the location coordinates 166 of the external server 160. Personal information 164 may include, for example, a social security number (SSN), a state identification (ID), a driver license number, an email address, a phone number, and/or other information associated with the external receiver 162. In some embodiments, the personal information 164 may be given to the user by the external receiver 162 or already present in the memory 130 (e.g., such as in a case where the user has previously communicated with the external receiver 162 and saved personal information 164 in memory 130). The file preparation engine 124 may identify the external receiver 162 by searching and matching personal information 164 from among personal information of external receivers in the memory 130. The automation script function to generate the CRC code 146 may have a handle such as, for example: generate_CRC_code (output_name=CRC_code01, for=external_receiver01, using=personal_information01, location_coordinates01).

The automation script function combines the personal information 164 of the external receiver 162 and the location coordinates 166 of external server 160 to generate a unique CRC code 146 for the plurality of files 132 to be accessed by the external receiver 162 at the external server 160. For example, if the SSN of the external receiver 162 is 87-5842-5390 and the location coordinates 166 of the external server 160 in decimal degrees is 41.40338, 2.17403, the CRC code 146 may include any combination or arrangement of the SSN and the location coordinates 166 such as 87-5842-5390_41.40338_2.17403; or 41.40338_2.17403_87-5842-5390; etc. In some embodiments, the CRC code 146 may be encrypted, such as by scrambling, and/or saved in a password-protected file, and then added to the plurality of files 132. The CRC code 146 may be used to facilitate that the sensitive information from the plurality of files 132 is accessed by the external receiver 162 at the location coordinates 166 of the external server 160. Other functions of the CRC code 146 are described in detail in conjunction with the operational flow illustrated in FIG. 2.

The file preparation engine 124 is also configured to generate and add the security code 138 to the plurality of files 132. The file preparation engine 124 may take the plurality of files 132, the personal information 164 of the external receiver 162, the location coordinates 166 of the external server 160, content distribution rules 134, security rules 136, and the CRC code 146 as inputs to an automation script function to generate the security code 138. For example, the function to generate the security code 138 for a specific external receiver 162 and a specific external server 160 may have a handle such as, for example: generate_security_code (output_name=security_code01, for=external_receiver01, using=personal_information01, location_coordinates01, content_distribution_rules, security_rules). The security code 138 is an automated script customized for the external receiver 162 and the external server 160. The content distribution rules 134 may include rules and information to identify files containing sensitive information from among the plurality of files 132, etc. The security rules 136 may include rules and information about configurations of operations of the feedback mechanism 138-1 (e.g., its frequency of reporting, etc.), the archival compliance mechanism 138-2 (e.g., its crawling privileges, keywords to search for, authorized and unauthorized actions, etc.) and self-destruction mechanism 138-3 (e.g., its retention time, etc.), etc.

In one embodiment, the security code 138 includes a feedback mechanism 138-1, an archival compliance mechanism 138-2, and a self-destruction mechanism 138-3. The security code 138 is configured to perform a plurality of tasks to monitor and manage the decompressed files 168 and other files associated with the decompressed files 168-1 at the external server 160 to secure the sensitive information from exposure. The security code 138 is programmed to be automatically executed when the second custom compressed file 144 is accessed by the external receiver 162 at the external server 160. Some examples of operations of the feedback mechanism 138-1, the archival compliance mechanism 138-2, and the self-destruction mechanism 138-3 are described in conjunction with the operational flow illustrated in FIG. 2.

Custom Compression Engine

The custom compression engine 126 may include or be provided with software instructions 128 executed by the processor 120. If the particular receiver is an internal receiver 152, the custom compression engine 126 is configured to generate a first custom compressed file 142. If the particular receiver is an external receiver 162, the custom compression engine 126 is configured to generate a second custom compressed file 144. The custom compression engine 126 includes a file compression method to reduce the size of the plurality of files 132. For example, the file compression may involve techniques to generate a .zip, .rar, or other compressed files as is known in the art.

In some embodiments, the custom compression engine 126 may generate the first custom compressed file 142 (if the particular receiver is an internal receiver 152) and the second custom compressed file 144 (if the particular receiver is an external receiver 162) from one or more files from the plurality of files 132 which contains sensitive information. In this approach, only files containing sensitive information from the plurality of files 132 are compressed which helps to reserve bandwidth usage of network 110 when sending the first custom compressed file 142 and the second custom compressed file 144. This conservation of bandwidth improves the operation of the network 110 and provides a technical advantage in system 100. In this case, other files from the plurality of files 132 not containing sensitive information may be sent without compression. The custom compression engine 126 may identify the files from the plurality of files 132 which contains sensitive information from their type, content, and sensitivity stored in content distribution rules 134 and/or security rules 136 determined by the organization. In some examples, the types of a file from the plurality of files 132 maybe pdf, doc, zip, etc. In some examples, the content of a file from the plurality of files 132 may be a code, a report, an image, a video, etc. In some examples, the sensitivity of each file from the plurality of files 132 may depend on its content determined by the organization. For example, if a first .pdf file contains bank account information and a second .pdf file contains published reports, the custom compression engine 126 identifies that the first .pdf file contains sensitive information and the second .pdf file does not, the custom compression engine 126 includes the first .pdf file in the first custom compressed file 142 (if the particular receiver is an internal receiver 152) or the second custom compressed file 144 (if the particular receiver is an external receiver 162). In another example, if a third file is a zip-type with a password, the custom compression engine 126 identifies that the third file contains sensitive information and includes it in the first custom compressed file 142 (if the particular receiver is an internal receiver 152) or the second custom compressed file 144 (if the particular receiver is an external receiver 162). Details of operations of the custom compression engine 126 are described in conjunction with the operational flow illustrated in FIG. 2.

FIG. 2 illustrates the operational flow of the system 100 from FIG. 1. In operation, the content distribution server 102 receives a request from a user such as through a user interface of the content distribution server 102 to send the plurality of files 132 associated with the organization to a particular receiver, where the plurality of files 132 contains sensitive information. The processor 120 determines whether the particular receiver is an internal receiver 152 or an external receiver 162 with respect to the organization. If the particular receiver is an internal receiver 152, the content distribution server 102 is configured to first add the credential information 154 of the internal receiver 152 to the plurality of files 132. The content distribution server 102 then generates a first custom compressed file 142 from the plurality of files 132. The first custom compressed file 142 is configured to be decompressed by the internal receiver 152 using credential information 154. The content distribution server 102 sends the first custom compressed file 142 to the archival storage 140 which is accessible to internal and external receivers (e.g., internal receiver 152 and external receiver 162) via network 110.

If the particular receiver is an external receiver 162, the content distribution server 102 is configured to first add the CRC code 146 to the plurality of files 132. The CRC code 146 includes the personal information 164 of the external receiver 162 and the location coordinates 166 of the external server 160. The content distribution server 102 then adds the security code 138 to the plurality of files 132. In one embodiment, the security code 138 comprises the feedback mechanism 138-1, the archival compliance mechanism 138-2, and the self-destruction mechanism 138-3. The content distribution server 102 is further configured to generate a second custom compressed file 144 from the plurality of files 132. The second custom compressed file 144 is configured to be decompressed by the external receiver 162 using personal information 164 at the location coordinates 166 of the external server 160. The content distribution server 102 sends the second custom compressed file 144 to the archival storage 140 for the external receiver 162 to retrieve.

When the external receiver 162 retrieves and decompresses the second custom compressed file 144 at the external server 162 as decompressed files 168, the security code 138 is automatically executed. The feedback mechanism 138-1 is configured to identify other files associated with the decompressed files 168-1. The feedback mechanism 138-1 is further configured to track locations and monitor the decompressed files 168 and other files associated with the decompressed files 168-1 within the directories of the external server 162. The archival compliance mechanism 138-2 is configured to monitor the decompressed files 168 and other files associated with the decompressed files 168-1 to detect any unauthorized actions performed on them. The feedback mechanism 138-1 is further configured to send feedback reports of actions performed on the decompressed files 168 and other files associated with the decompressed files 168-1. The self-destruction mechanism 138-3 is configured to delete the decompressed files 168 and other files associated with the decompressed files 168-1 at the end of a retention time set by the user.

The operational flow begins when the user operating the content distribution server 102 selects the plurality of files 132 to send to the particular receiver. Then, the processor 120 determines whether the particular receiver is an internal receiver 152 or an external receiver 162 with respect to the organization based on the credential information 154 of the internal receiver 152 and the personal information 164 of the external receiver 162. FIG. 2 illustrates two examples of (1) sending the plurality of files 132 to the internal receiver 152; and (2) sending the plurality of files 132 to the external receiver 162, with respect to the organization.

First Case where the Particular Receiver is an Internal Receiver

As shown in FIG. 2, if processor 120 determines that the particular receiver is an internal receiver 152, the SSO engine 122 adds credential information 154 to the plurality of files 132. In some examples, the credential information 154 of the internal receiver 152 is saved in a .txt, a .pdf, or any other formats and then is added to the plurality of files 132. In some embodiments, the credential information 154 may be encrypted and/or saved in a password-protected file before being added to the plurality of files 132. For example, the credential information 154 may be encrypted by such as scrambling, etc., saved in a password-protected file, and then added to the plurality of files 132. The purpose of adding the credential information 154 of the internal receiver 152 to the plurality of files 132 is to facilitate that the plurality of files 132 is accessed only by the internal receiver 152. In some embodiments, a unique data other than credential information 154 (e.g., a username-password combination set by the internal receiver 152 and/or the user) may be used to facilitate that that the plurality of files 132 is accessed only by the internal receiver 152.

In the first case where the particular receiver is an internal receiver 152, the custom compression engine 126 is configured to generate the first custom compressed file 142 from the plurality of files 132. Here, the custom compression engine 126 generates the first custom compressed file 142 such that it is configured to be password-protected based on the credential information 154 of the internal receiver 152. The first custom compressed file 142 is also configured to be decompressed and unlocked using the credential information 154 of the internal receiver 152. For example, the custom compression engine 126 may include a function to generate the first custom compressed file 142 with a handle of, such as: generate_custom_compressed_file (input=files, receiver=internal_receiver01, set_password_using=credential_information01), where the particular receiver is an internal receiver 152. In one embodiment, the custom compression engine 126 may send the first custom compressed file 142 to the archival storage 140 for the internal receiver 152 to retrieve. The archival storage 140 may include or be provided with a cloud sharing environment with a memory configured to maintain structured archives or files such as google drive. When the internal receiver 152 retrieves the first custom compressed file 142 and saves it in internal server 150, he/she may decompress and unlock the first custom compressed file 142 with credential information 154 into decompressed files 156. In another embodiment, the custom compression engine 126 may send the first custom compressed file 142 directly to the internal receiver 152, via network 110, for example by an email, sharing its link on a cloud platform, etc.

Second Case where the Particular Receiver is an External Receiver

As shown in FIG. 2, if processor 120 determines that the particular receiver is an external receiver 162, the file preparation engine 124 adds personal information 164 to the plurality of files 132. In some examples, the personal information 164 of the external receiver 162 is saved in a .txt, a .pdf, or any other formats and then is added to the plurality of files 132. In some embodiments, the personal information 164 may be encrypted by such as scrambling, etc. and/or saved in a password-protected file before being added to the plurality of files 132.

The file preparation engine 124 then adds the CRC code 146 to the plurality of files 132. The CRC code 146 is generated based on the personal information 164 of the external receiver 162 and location coordinates 166 of external server 160. The CRC code 146 is used to validate whether the external receiver 162 is accessing the second custom compressed file 144 by authenticating the identity of the external receiver 162 based on personal information 164, for example, by popping up a window asking for the personal information 164 when a person attempts to access the second custom compressed file 144. With this method, if a person other than the external receiver 162 attempts to access the second custom compressed file 144, their attempt will fail, logged, and reported back to the organization and/or the user. The CRC code 146 is also used to validate whether the second custom compressed file 144 is accessed at the location coordinates 166 of the external server 160, which may be the global positioning system (GPS) coordinates of the external server 160 in one embodiment. The CRC code 146 may be used to validate the GPS coordinates of the external server 160 by matching the GPS coordinates paired with the internet protocol (IP) address of the external server 160 with the location coordinates 166 of the external server 160 given to the user. In this process, when the external receiver 162 attempts to decompress the second custom compressed file 144 in the external server 160, the location coordinates 166 is checked against the GPS coordinates of the external server 160. If the location coordinates 166 matches the GPS coordinates of the external server 160, the second custom compressed file 144 is decompressed. Otherwise, the second custom compressed file 144 remains compressed and locked. If the second custom compressed file 144 is sent to a first server with first GPS coordinates, the CRC code 146 compares the first GPS coordinates with the location coordinates 166. If the first GPS coordinates differ from the location coordinates 166, the second custom compressed file 144 remains compressed and locked. These events may be logged and reported back to the organization and/or the user, for example by an access detection function in the CRC code 146, where the access detection function has a handle of, such as: is_accessed (input=custom_compressed_file01, authenticated_receiver=external_receiver01, check_location=GPS_coordinates01). The file preparation engine 124 then adds the security code 138 to the second custom compressed file 144. The configurations and rules of the security code 138 are configurable and set by the user and/or organization and stored in content distribution rules 134 and security rules 136.

In the second case where the particular receiver is an external receiver 162, the custom compression engine 126 is configured to generate the second custom compressed file 144 from the plurality of files 132. Here, the custom compression engine 126 generates the second custom compressed file 144 such that it is configured to be password-protected based on the CRC code 146 customized from the personal information 164 of the external receiver 162 and the location coordinates 166 of the external server 160. For example, the custom compression engine 126 may generate the second custom compressed file 144 if the particular receiver input to the custom compression engine 126 is the external receiver 162 such as: generate_custom_compressed_file (input=files, receiver=external-receiver01, set_password_using=CRC_code01).

In some embodiments, the custom compression engine 126 may generate the second custom compressed file 144 from one or more files from the plurality of files 132 which contains sensitive information. In this approach, only files containing sensitive information from the plurality of files are custom compressed, which in turn helps to reserve bandwidth usage of network 110 when sending the second custom compressed file 144. In this case, other files from the plurality of files 132 not containing sensitive information may be sent without compression. The second custom compressed file 144 is also configured to be decompressed and unlocked using the CRC code 146. Once the second custom compressed file 144 is generated, in one embodiment, the custom compression engine 126 may send the second custom compressed file 144 to the archival storage 140 for the external receiver 162 to retrieve. In another embodiment, the custom compression engine 126 may send the second custom compressed file 144 directly to the external receiver 162 via network 180. When the external receiver 162 receives the second custom compressed file 144 and saves it in external server 160, he/she may decompress and unlock the second custom compressed file 144 with the CRC code 146.

When the second custom compressed file 144 is decompressed, the security code 138 is automatically executed and the feedback mechanism 138-1, the archival compliance mechanism 138-2, and the self-destruction mechanism 138-3 are initiated.

Feedback Mechanism

The feedback mechanism 138-1 is programmed to identify other files associated with the decompressed files 168-1 in the external server 162. The external receiver 162 may use the decompressed files 168 for a project such as developing a software application, generating a business platform, generating a report, etc. While the external receiver 162 is working on such projects, one or more files may be generated and/or spawned therefrom that includes the sensitive information from the decompressed files 168. Thus, it is important to identify other files associated with the decompressed files 168-1 because they may also include sensitive information from the decompressed files 168. For example, the decompressed files 168 may include an executable code that when executed, one or more files such as report files, simulation results, etc. are generated as a result of testing and/or executing the code. In one embodiment, the feedback mechanism 138-1 may identify other files associated with the decompressed files 168-1 by crawling the directories of the external server 160 and searching for a specific keyword in titles and/or contents of files, where the specific keyword is specified by the user in the feedback mechanism 138-1. The feedback mechanism 138-1 may be configured to add the specific keyword to the files generated from the decompressed files 168 and search for that specific keyword in the titles and/or contents of files within the directories of the external server 162. For example, if the decompressed files 168 have a specific keyword such as "project01" in their titles and/or contents, and when the external receiver 162 uses the decompressed files 168 in a project and other files are generated from them, the feedback mechanism 138-1 may have a function to add the "project01" keyword to the title of the files generated from the decompressed files 168. An example of the handle of this function would be add_keyword (generated_files=file01; file02, keyword=project01, add_to=title). In this example, the "project01" keyword will be added to the title of the generated files file01 and file02, and their title after executing this function will be file01_project01 and file02_project01. Then, the feedback mechanism 138-1 may find the files with this keyword with a function with a handle of, such as, for example: find_files (fitle_contains=project01, content_contains=project01).

In one embodiment, crawling privileges of the feedback mechanism 138-1 to search the directories of the external server 160 may be specified by the user and stored in security rules 136. In some examples, the crawling privileges may be configurable to search nearby folders, such as 2-levels up and 2-levels down from the folder in which the second custom compressed file 144 is decompressed. For example, the crawling privileges may be an input to the function to find the other files associated with the decompressed files 168-1 mentioned above, where the function has a handle of, such as: find_files (fitle_contains=project01, content_contains=project01, crawling_privilege=2_level).

In another embodiment, the feedback mechanism 138-1 may identify the other files associated with the decompressed files 168-1 based on instructions in the feedback mechanism 138-1 that specify the titles, contents, and/or locations of the other files associated with the decompressed files 168-1 that would be generated or spawned from the decompressed files 168. For example, when the external receiver 162 uses the decompressed files 168 in a project and other files are generated from them, the feedback mechanism 138-1 may include instructions that specifies where in the directories of the external server 160 the other files 168-1 should be placed and/or what keyword(s) should be included in their titles and/or contents.

The feedback mechanism 138-1 is also programmed to track locations of the decompressed files 168 and other files associated with the decompressed files 168-1 within the directories of the external server 160, for example by using the find_files function mentioned above and/or other functions. After the external receiver 162 decompresses and unlocks the second custom compressed file 144, he/she may use the decompressed files 168 in a project that requires several folders and/or directories. As such, it is important to track the locations of the decompressed files 168 and other files associated with the decompressed files 168-1 wherever they are spread in the directories of the external server 160. For example, if the external receiver 162 changes the location of a first file from the decompressed files 168 and other files associated with the decompressed files 168-1, the feedback mechanism 138-1 may track the location of the first file by crawling through the directories of the external server 160 and searching for the specific keyword already identified in its title and/or content, e.g., using the find_files function mentioned above.

The feedback mechanism 138-1 is also programmed to send feedback reports of actions performed on the decompressed files 168 and other files associated with the decompressed files 168-1 to the user. Examples of generating feedback reports are described in conjunction with the archival compliance mechanism 138-2.

Archival Compliance Mechanism

The archival compliance mechanism 138-2 is configured to monitor the decompressed files 168 and other files associated with the decompressed files 168-1 to detect any unauthorized actions performed on them. The unauthorized actions comprise any action that may lead to exposure of the sensitive information of the decompressed files 168. In some examples, the unauthorized actions performed on the decompressed files 168 or files associated with the decompressed files 168-1 may comprise copying, moving, changing, or deleting at least one file from the decompressed files 168 or files associated with the decompressed files 168-1. The unauthorized actions may further comprise attempting to access any of the decompressed files 168 or files associated with the decompressed files 168-1 by a first person other than the external receiver 162. The unauthorized actions are specified by the user and stored in security rules 136. In some examples, if a person attempts to copy, move, edit, or delete a first file, the archival compliance mechanism 138-2 may be triggered to pop up a window to ask for the personal information 164 and/or the password based on the personal information 164 of the external receiver 162 to facilitate that the person attempting to copy, move, edit, or delete the first file is the external receiver 162. In some examples, if a person attempts to attach a second file from the decompressed files 168 or files associated with the decompressed files 168-1 to an email, the archival compliance mechanism 138-2 may be triggered to pop up a window to ask for the personal information 164 and/or the password based on the personal information 164. For example, the function to detect any unauthorized actions performed on the decompressed files 168 and other files associated with the decompressed files 168-1 may have a handle such as, for example: check_access (files, unauthorized_action=copy, move, delete, edit, attach_to_email, authenticated_receiver=external_receiver01), where the unauthorized actions are specified to be copying, moving, deleting, editing, and attaching to an email, and checking whether the external receiver 162 is accessing a file from the decompressed files 168 and other files associated with the decompressed files 168-1.

In the above-mentioned examples of unauthorized actions, each event is logged and saved in a feedback report to be sent to the user by the feedback mechanism 138-1. The feedback mechanism 138-1 also saves authorized actions performed on the decompressed files 168 and files associated with the decompressed files 168-1, such as executing, opening, and the like in a feedback report and sends it to the user. For example, when the external receiver 162 opens a first file from the decompressed files 168 and files associated with the decompressed files 168-1, the feedback mechanism 138-1 saves the time and duration of the access to the first file in a first feedback report file and sends the first feedback report file to the user. In another example, when a person other than the external receiver 162 attempts to copy a file from the decompressed files 168 and other files associated with the decompressed files 168-1 to another folder, their copy attempt will fail and the feedback mechanism 138-1 saves this failed copy attempt in a second feedback report file and sends the second feedback report file to the user. In another example, when a person other than the external receiver 162 attempts to open a file from the decompressed files 168 and other files associated with the decompressed files 168-1, their access attempt will fail and the feedback mechanism 138-1 saves this failed access attempt in a third feedback report file and sends the third feedback report file to the user. In some embodiments, the feedback mechanism 138-1 saves different actions performed on the decompressed files 168 and files associated with the decompressed files 168-1 in one feedback report file periodically, for example every 24 hours, and then sends the feedback report file to the user. The frequency of sending feedback reports is set by the user and/or organization and stored in content distribution rules 134. For example, the function to send feedback reports has a handle of, such as: send_report (files, actions=authorized, unauthorized, period=24_hours). The feedback mechanism 138-1 sends feedback reports even after the retention time of the self-destruction mechanism 138-3 to facilitate that no file from the decompressed files 168 and other files associated with the decompressed files 168-1 is still being accessed.

Self-Destruction Mechanism

The self-destruction mechanism 138-3 is configured to delete the decompressed files 168 and other files associated with the decompressed files 168-1 at the retention time specified by the user stored in the security rules 136. For example, the self-destruction mechanism 138-3 may include a counter function that starts a count-down to delete the decompressed files 168 by the retention time, e.g., 6 months starting from the time the second custom compressed file 144 is decompressed at the external server 160. The user may specify the retention time based on time requirements of the project and/or the external receiver 162 needs to have access to the decompressed files 168. For example, for a software application development project, the user may specify a longer retention time suitable for this project, such as 6 months. The user may specify a shorter retention time, such as 1 month, for a small project, such as generating a report of the number of transactions from clients of the organization for the past 5 days. For example, the user may set the retention time to be 1 month (i.e., 730:00:00 in hours: minutes: seconds format) from when the second custom compressed file 144 is decompressed at the external server 162. In this example, the counter function in the self-destruction mechanism 138-3 may start a count-down from 730:00:00 to reach 000:00:00. When the count-down reaches 000:00:00, it triggers the self-destruction mechanism 138-3 to delete the decompressed files 168 and other files associated with the decompressed files 168-1. For example, the counter function to delete the decompressed files 168 and other files associated with the decompressed files 168-1 has a handle of self destruct (files, retention_time=6_month), where the retention time is specified to be 6 months.

In some embodiments, if the decompressed files 168 and the other files associated with the decompressed files 168-1 are not deleted by the set retention time, the feedback mechanism 138-1 is also programmed (as a backup) to delete the decompressed files 168 and other files associated with the decompressed files 168-1. For example, when the count-down in the self-destruction mechanism reaches 000:00:00 and (e.g., due to an error), a file from the decompressed files 168 and the files associated with the decompressed files 168-1 is not deleted yet, the feedback mechanism 138-1 deletes the file.

Example of a Method for Managing Content Distribution

Figure 3A:
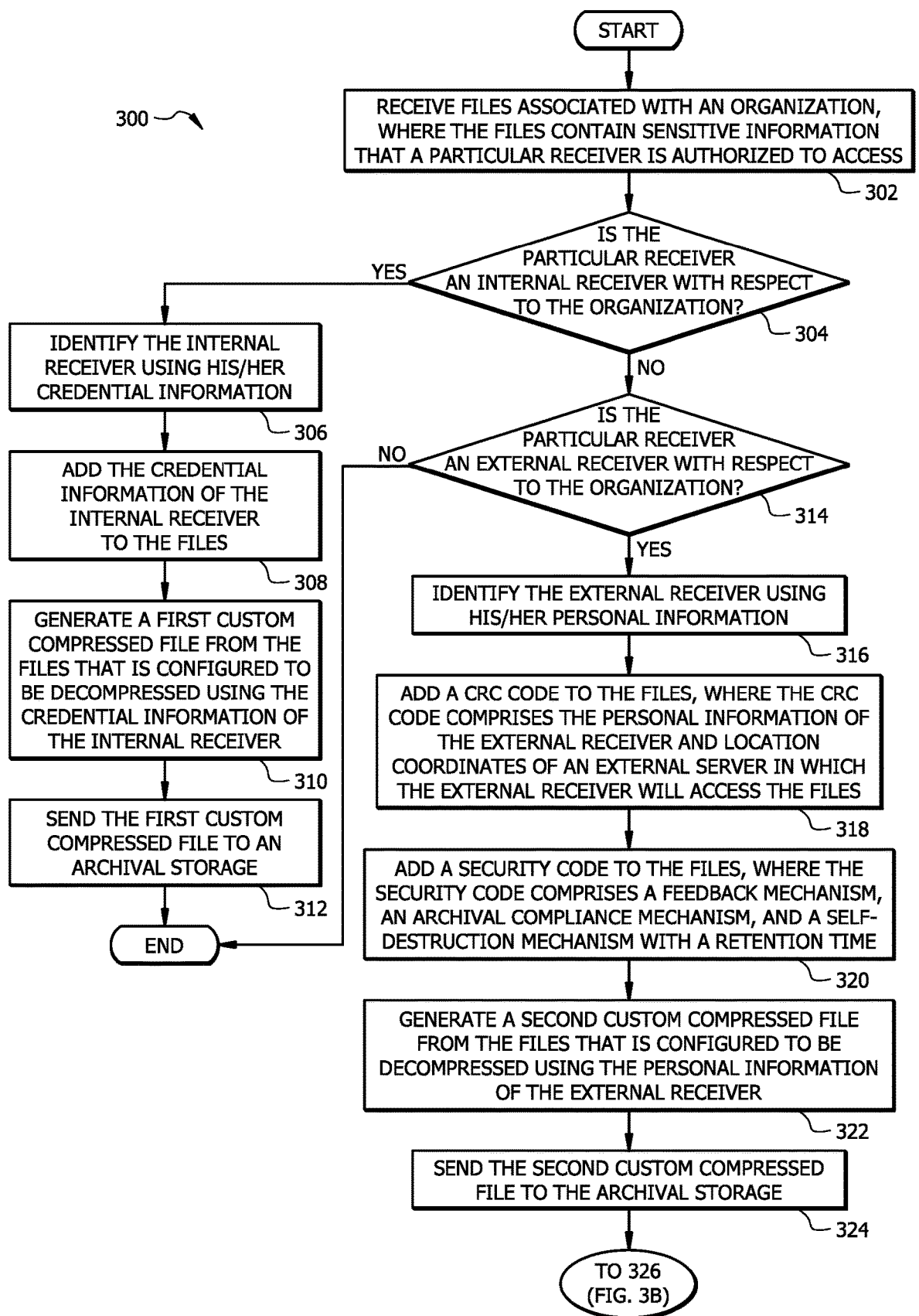
FIGS. 3A and 3B illustrate an example of a flow chart of a method for managing content distribution.
Figure 3B:
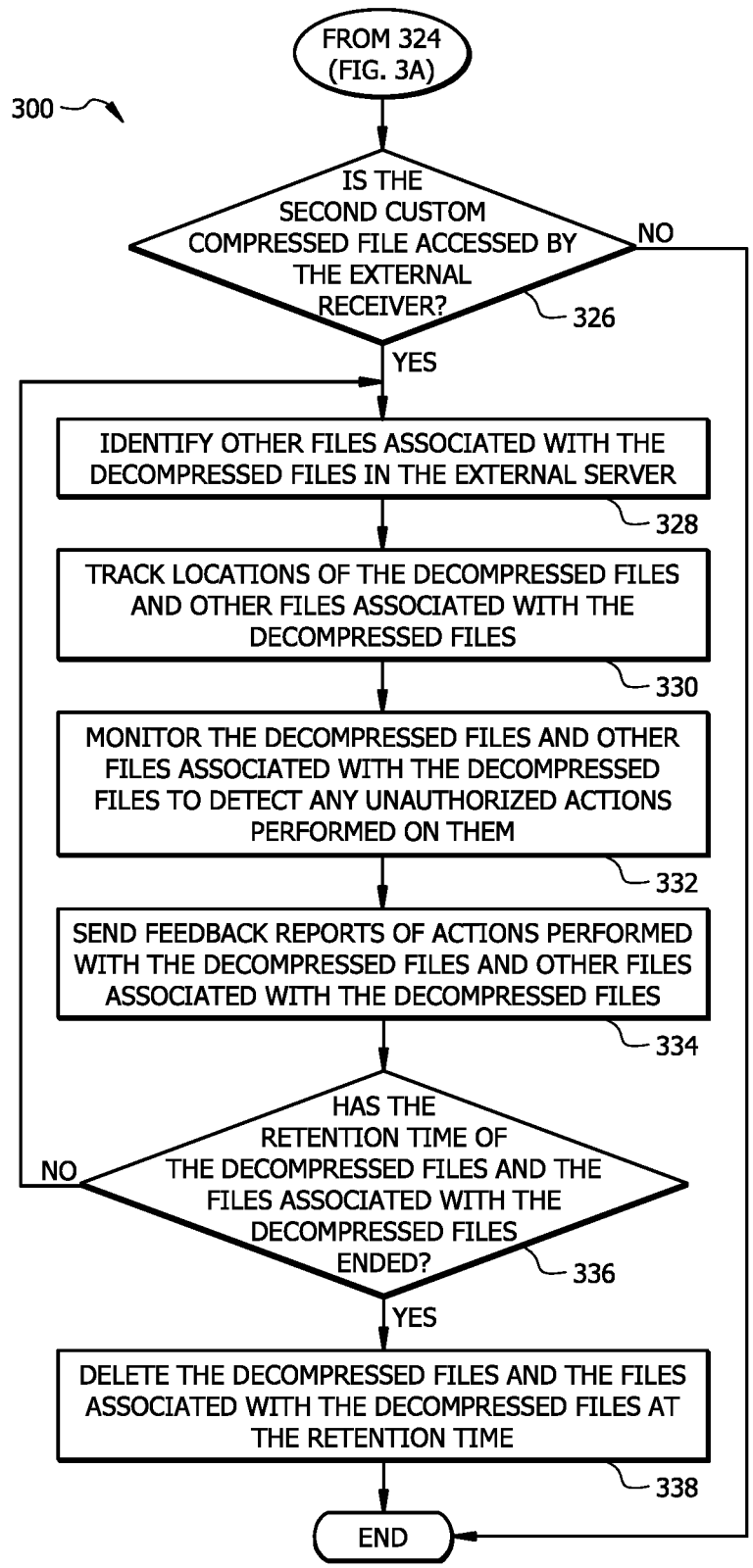

FIGS. 3A and 3B illustrate a flow chart of a method 300 for managing content distribution from an organization to a particular receiver. One or more of steps 302-338 of the method 300 may be implemented, at least in part, in the form of executable code 106 stored on non-transitory, tangible, machine-readable media that when run by one or more processors may cause the one or more processors to perform steps 302-338. In some embodiments, method 300 may be performed on systems 100 of FIGS. 1 and 2, respectively, including content distribution server 102 in signal communication with archival storage 140, internal server 150, and external server 160 via network 110. Aspects of the steps 302-338 of method 300 have been covered in the description for FIGS. 1 and 2; and additional aspects are provided below.

The method 300 begins at step 302 where a plurality of files 132 is received from the user operating the content distribution server 102. The content distribution server 102 may receive the plurality of files 132 from the user, for example, via a user interface on a display screen of the content distribution server 102. The user may select the plurality of files 132 from a memory, e.g., memory 130 on the user interface of the content distribution server 102.

In step 304, the processor 120 determines whether the particular receiver is an internal receiver with respect to the organization (e.g., an employee of the organization) such as the internal receiver 152 at least in part based on the credential information 154 of the internal receiver 152 stored in memory 130. Based on the credential information 154, if the particular receiver is an employee of the organization, the processor 120 determines that the particular receiver is an internal receiver, e.g., the internal receiver 152 who is authorized to log in to the network of the organization with the credential information 154. If, at step 304, the processor 120 determines that the particular receiver is an internal receiver 152, method 300 proceeds to carry out steps 306-312. In step 306, the processor 120 identifies the internal receiver 152 using credential information 154. In a step 308, the SSO engine 122 adds the credential information 154 of the internal receiver 152 to the plurality of files 132. In step 310, the custom compression engine 126 generates the first custom compressed file 142 from the plurality of files 132 that contains sensitive information.

In step 312, the first custom compressed file 142 is sent to the archival storage 140, e.g., by using the user interface of the content distribution server 102 via network 110. The internal receiver 152 may then access the archival storage 140, retrieve the first custom compressed file 142, and decompress and unlock it using credential information 154 at the internal server 150. In some embodiments, the user may send the first custom compressed file 142 directly to the internal receiver 152, for example, via email, transferring by cloud sharing platforms, and/or the like.

Referring back to step 304, if the processor 120 determines that the particular receiver is not an internal receiver with respect to the organization, method 300 proceeds to step 314. In step 314, the processor 120 determines whether the particular receiver is an external receiver with respect to the organization such as the external receiver 162 at least in part based on the personal information 164 of the external receiver 162 stored in the memory 130. Based on the personal information 164, if the particular receiver is not an employee of the organization, the SSO engine 122 determines that the particular receiver is an external receiver, e.g., external receiver 162 who does not have SSO credentials to log in to the network of the organization.

If, at step 314, the processor 120 cannot identify the particular receiver, the plurality of files 132 is not sent to the particular receiver and method 300 is terminated. However, if the processor 120 determines that the particular is an external receiver, e.g., the external receiver 162 with respect to the organization, method 300 proceeds to carry out steps 316-338 to prepare and send the plurality of files 132 to the external receiver, e.g., the external receiver 162.

In step 316, the file preparation engine 124 identifies the external receiver 162 using the personal information 164 of the external receiver 162. In step 318, the file preparation engine 124 adds the CRC code 146 to the plurality of files 132. In some embodiments, the CRC code 146 may be encrypted and/or saved in a password-protected file and then added to the plurality of files 132 as described in FIG. 2.

In step 320, the files preparation engine 124 adds the security code 138 to the plurality of files 132. The security code 138 is configured to be automatically executed when the second custom compressed file 144 is decompressed by the external receiver 162 at the external server 160. For example, the security code 138 may be programmed in an executable file (e.g., a .exe file) and is automatically executed when the second custom compressed file 144 is accessed at the external server 160. In some embodiments, the security code 138 may be configured to perform functions described herein and other suitable functions to facilitate that the sensitive information of the plurality of files 132 is monitored and secured from exposure to a receiver unauthorized to access the sensitive information from the second custom compressed file 144.

In step 322, the custom compression engine 126 generates the second custom compressed file 144 from the plurality of files 132. The second custom compressed file 144 is configured to be password-protected customized based on the personal information 164 of the external receiver 162 which was used in generating the CRC code 146. The second custom compressed file 144 is also configured to be decompressed and unlocked by a password based on the personal information 164 of the external receiver 162. The second custom compressed file 144 is also configured to be decompressed and unlocked at the location coordinates 166 of the external server 160 which was used in generating the CRC code 146.

In step 324, the second custom compressed file 144 is sent to archival storage 140, e.g., by using the user interface via network 110. The external receiver 162 may then access the archival storage 140, retrieve the second custom compressed file 144, and decompress and unlock it at the external server 160 using personal information 164. In some embodiments, the CRC code 146 may further be configured to authenticate whether the external receiver 162 is retrieving the second custom compressed file 144 from the archival storage 140 based on personal information 164. For example, when a person attempts to retrieve the second custom compressed file 144 from the archival storage 140, the CRC code 146 may be triggered to pop up a window to ask for the personal information 164 and/or a password based on the personal information 164. In some embodiments, the user may send the second custom compressed file 144 directly to the external server 160, for example, via email, transferring by cloud sharing platforms, and/or the like.

In step 326, it is determined whether the second custom compressed file 144 is accessed by the external receiver 162 at the external server 160. If, at step 326, is it determined that the second custom compressed file 144 is not being accessed by the external receiver 162 at the external server 160, the second custom compressed file 144 is not decompressed or unlocked and method 300 is terminated. If, for example, the external receiver 162 retrieves the second custom compressed file 144 and attempts to decompress it at a first server other than the external server 160, the CRC code 146 blocks the decompression of the second custom compressed file 144.

As discussed, the CRC code 146 includes the location coordinates 166, e.g., GPS coordinates of the external server 160. The CRC code 146 may determine location coordinates, e.g., GPS coordinates of the first server by using the (internet protocol) IP address of the first server and determine whether the GPS coordinates of the external server 160 match the GPS coordinates of the first server. If they do not match, the second custom compressed file 144 remains locked. In another example, if a first person other than the external receiver 162 attempts to decompress the second custom compressed file 144 at the external server 160, the second custom compressed file 144 remains locked since the second custom compressed file 144 is password-protected where the password is based on the personal information 164 of the external receiver 162.

If, at step 326, it is determined that the second custom compressed file 144 is being accessed, decompressed, and unlocked by the external receiver 162 at the external server 160, the security code 138 is automatically executed to perform steps 328-338.

In step 328, the feedback mechanism 138-1 identifies other files associated with the decompressed files 168-1 by crawling the directories of the external server 160 and searching for specific keywords in titles and/or contents of files, where the specific keywords are specified by the user in the feedback mechanism 138-1 as described in FIG. 2.

In step 330, the feedback mechanism 138-1 tracks locations of the decompressed files 168 and other files associated with the decompressed files 168-1 by using a pathfinding function. The feedback mechanism 138-1 may include a function to find the location of each file from the decompressed files 168 and other files associated with the decompressed files 168-1 that have a certain keyword in their title and/or first line of content as described in FIG. 2.

In step 332, the archival compliance mechanism 138-2 monitors the decompressed files 168 and other files associated with the decompressed files 168-1 to detect any unauthorized actions performed on them where the unauthorized actions are specified by the user. The archival compliance mechanism 138-2 may use a function to detect if anyone other than the external receiver is attempting to perform an unauthorized action on the decompressed files 168 and other files associated with the decompressed files 168-1 as described in FIG. 2.

In step 334, the feedback mechanism 138-1 sends feedback reports of actions performed on the decompressed files 168 and other files associated with the decompressed files 168-1, for example to the user. For example, the feedback mechanism 138-1 may include a function to send feedback reports of actions performed on the decompressed files 168 and other files associated with the decompressed files 168-1 as described in FIG. 2

In step 336, the self-destruction mechanism 138-3 determines whether the retention time to delete the decompressed files 168 and other files associated with the decompressed files 168-1 is reached as described in FIG. 2.

If, at step 336, the self-destruction mechanism 138-3 determines that the retention time has not ended, method 300 returns to step 328. If, at step 336, the self-destruction mechanism 138-3 determines that the retention time is ended, method 300 proceeds to step 338 where the self-destruction mechanism 138-3 deletes the decompressed files 168 and other files associated with the decompressed files 168-1. In some embodiments, if the retention time has ended and (e.g., due to an error), the self-destruction mechanism 138-3 has not deleted the decompressed files 168 and files associated with the decompressed files 168-1, the feedback mechanism 138-1 may be triggered to initiate the deletion of the decompressed files 168 and files associated with the decompressed files 168-1, as a backup.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for managing a plurality of files associated with an organization, the system comprising:
   a memory configured to store a plurality of files, wherein the plurality of files contains sensitive information that is authorized for access by a particular receiver; and
   a processor configured to:
      determine whether the particular receiver is an internal receiver or an external receiver with respect to the organization;
      if the particular receiver is an external receiver:
         identify the external receiver based on personal information of the external receiver;
         add a cyclic redundancy check (CRC) code to the plurality of files, wherein the CRC code comprises the personal information of the external receiver and location coordinates of an external server at which the external receiver will access the plurality of files;
         add a security code to the plurality of files, wherein the security code comprises a feedback mechanism, an archival compliance mechanism, and a self-destruction mechanism with a retention time;
         generate a second custom compressed file from the plurality of files, wherein the second custom compressed file is configured to be decompressed by the external receiver using the personal information of the external receiver;
         send the second custom compressed file to the archival storage; and
         when the external receiver decompresses the second custom compressed file at the external server, the security code executes to:
            identify other files associated with the decompressed files in the external server using the feedback mechanism;
            track locations of the decompressed files and other files associated with the decompressed files by searching directories of the external server using the feedback mechanism;
            monitor the decompressed files and other files associated with the decompressed files using the archival compliance mechanism to detect any unauthorized actions performed on the decompressed files and other files associated with the decompressed files;
            send feedback reports of actions performed with the decompressed files and other files associated with the decompressed files using the feedback mechanism; and
            delete the decompressed files and the other files associated with the decompressed files at the retention time of the self-destruction mechanism.

2. The system in claim 1, wherein the processor is further configured to determine whether the particular receiver is the internal receiver or the external receiver with respect to the organization at least in part based upon credential information of the internal receiver and the personal information of the external receiver.

3. The system of claim 2, wherein the credential information of the internal receiver is a single-sign-on (SSO) of the internal receiver, wherein the personal information of the external receiver is a social security number (SSN), a state identification (ID), a driver license number, an email address, or a phone number associated with the external receiver.

4. The system of claim 1, wherein the CRC code is configured to validate:
   whether the second custom compressed file is accessed by the external receiver based on the personal information of the external receiver when the external receiver decompresses the second custom compressed file; and
   whether the second custom compressed file is accessed at the external server based on global positioning system (GPS) coordinates of the external server when the external receiver decompresses the second custom compressed file at the external server.

5. The system of claim 1, wherein the retention time of the self-destruction mechanism is configurable and set by a sender.

6. The system of claim 1, wherein the unauthorized actions performed on the decompressed files comprise:
   copying at least one file from the decompressed files;
   moving at least one file from the decompressed files;
   changing at least one file from the decompressed files;
   deleting at least one file from the decompressed files; or
   attempting to access any of the decompressed files by an entity other than the external receiver.

7. The system of claim 1, wherein if the decompressed files and the other files associated with the decompressed files are not deleted by the retention time determined by the self-destruction mechanism, the feedback mechanism is further configured to delete the decompressed files and the other files associated with the decompressed files.

8. A method for managing a plurality of files associated with an organization, wherein the plurality of files contains sensitive information that is authorized for access by a particular receiver, the method comprising:
   determining whether the particular receiver is an internal receiver or an external receiver with respect to the organization;
   if the particular receiver is an external receiver:
      identifying the external receiver based on personal information of the external receiver;
      adding a cyclic redundancy check (CRC) code to the plurality of files, wherein the CRC code comprises the personal information of the external receiver and location coordinates of an external server at which the external receiver will access the plurality of files;
      adding a security code to the plurality of files, wherein the security code comprises a feedback mechanism, an archival compliance mechanism, and a self-destruction mechanism with a retention time;
      generating a second custom compressed file from the plurality of files, wherein the second custom compressed file is configured to be decompressed by the external receiver using the personal information of the external receiver;
      sending the second custom compressed file to the archival storage; and
      when the external receiver decompresses the second custom compressed file at the external server:
         identifying other files associated with the decompressed files in the external server using the feedback mechanism;
         tracking locations of the decompressed files and other files associated with the decompressed files by searching directories of the external server using the feedback mechanism;

monitoring the decompressed files and other files associated with the decompressed files using the archival compliance mechanism to detect any unauthorized actions performed on the decompressed files and other files associated with the decompressed files;

sending feedback reports of actions performed with the decompressed files and other files associated with the decompressed files using the feedback mechanism; and deleting the decompressed files and the other files associated with the decompressed files at the retention time of the self-destruction mechanism.

9. The method in claim 8, wherein the method is further comprising:
determining whether the particular receiver is the internal receiver or the external receiver with respect to the organization at least in part based upon credential information of the internal receiver and the personal information of the external receiver.

10. The method in claim 9, wherein the credential information of the internal receiver is a single-sign-on (SSO) of the internal receiver, wherein the personal information of the external receiver is a social security number (SSN), a state identification (ID), a driver license number, an email address, or a phone number associated with the external receiver.

11. The method in claim 8, wherein the CRC code is configured to validate:
whether the second custom compressed file is accessed by the external receiver based on the personal information of the external receiver when the external receiver decompresses the second custom compressed file; and
whether the second custom compressed file is accessed at the external server based on global positioning system (GPS) coordinates of the external server when the external receiver decompresses the second custom compressed file at the external server.

12. The method in claim 8, wherein the retention time of the self-destruction mechanism is configurable and set by a sender.

13. The method in claim 8, wherein the unauthorized actions performed on the decompressed files comprise:
copying at least one file from the decompressed files;
moving at least one file from the decompressed files;
changing at least one file from the decompressed files;
deleting at least one file from the decompressed files; or
attempting to access any of the decompressed files by an entity other than the external receiver.

14. The method in claim 8, wherein if the decompressed files and the other files associated with the decompressed files are not deleted by the retention time determined by the self-destruction mechanism, the method further comprising:
deleting the decompressed files and the other files associated with the decompressed files by the feedback mechanism.

15. A non-transitory computer-readable medium storing instructions that when executed by a processor cause the processor to:
receive a plurality of files associated with an organization, wherein the plurality of files contains sensitive information that is authorized for access by a particular receiver;
determine whether the particular receiver is an internal receiver or an external receiver with respect to the organization;
if the particular receiver is an external receiver:

identify the external receiver based on personal information of the external receiver;
add a cyclic redundancy check (CRC) code to the plurality of files, wherein the CRC code comprises the personal information of the external receiver and location coordinates of an external server at which the external receiver will access the plurality of files;
add a security code to the plurality of files, wherein the security code comprises a feedback mechanism, an archival compliance mechanism, and a self-destruction mechanism with a retention time;
generate a second custom compressed file from the plurality of files, wherein the second custom compressed file is configured to be decompressed by the external receiver using the personal information of the external receiver;
send the second custom compressed file to the archival storage; and
when the external receiver decompresses the second custom compressed file at the external server, the security code executes to:
identify other files associated with the decompressed files in the external server using the feedback mechanism;
track locations of the decompressed files and other files associated with the decompressed files by searching directories of the external server using the feedback mechanism;
monitor the decompressed files and other files associated with the decompressed files using the archival compliance mechanism to detect any unauthorized actions performed on the decompressed files and other files associated with the decompressed files;
send feedback reports of actions performed with the decompressed files and other files associated with the decompressed files using the feedback mechanism; and
delete the decompressed files and the other files associated with the decompressed files at the retention time of the self-destruction mechanism.

16. The non-transitory computer readable medium of claim 15, wherein the instructions further cause the processor to determine whether the particular receiver is the internal receiver or the external receiver with respect to the organization at least in part based upon credential information of the internal receiver and the personal information of the external receiver.

17. The non-transitory computer readable medium of claim 16, wherein the credential information of the internal receiver is a single-sign-on (SSO) of the internal receiver, wherein the personal information of the external receiver is a social security number (SSN), a state identification (ID), a driver license number, an email address, or a phone number associated with the external receiver.

18. The non-transitory computer readable medium of claim 15, wherein the CRC code is configured to validate:
whether the second custom compressed file is accessed by the external receiver based on the personal information of the external receiver when the external receiver decompresses the second custom compressed file; and
whether the second custom compressed file is accessed at the external server based on global positioning system (GPS) coordinates of the external server when the external receiver decompresses the second custom compressed file at the external server.

19. The non-transitory computer readable medium of claim 15, wherein the unauthorized actions performed on the decompressed files comprise:
   copying at least one file from the decompressed files;
   moving at least one file from the decompressed files;
   changing at least one file from the decompressed files;
   deleting at least one file from the decompressed files; or
   attempting to access any of the decompressed files by an entity other than the external receiver.

20. The non-transitory computer readable medium of claim 15, wherein if the decompressed files and the other files associated with the decompressed files are not deleted by the retention time determined by the self-destruction mechanism, the feedback mechanism is further configured to delete the decompressed files and the other files associated with the decompressed files.

* * * * *